Nov. 1, 1949.  M. D. WALKLET  2,486,583
BICYCLE KICK STAND
Filed Feb. 15, 1945
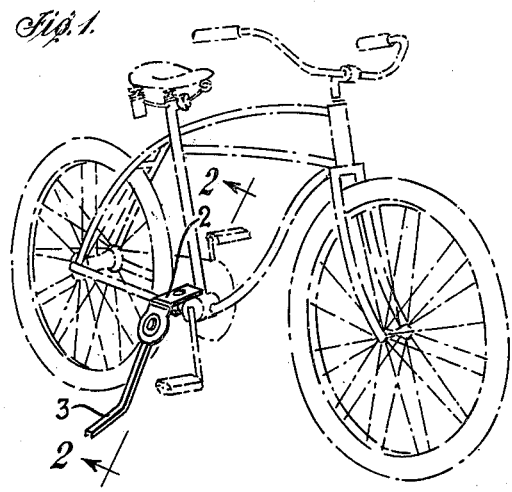
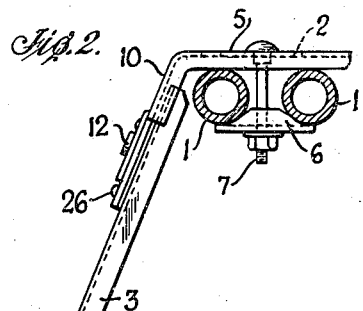
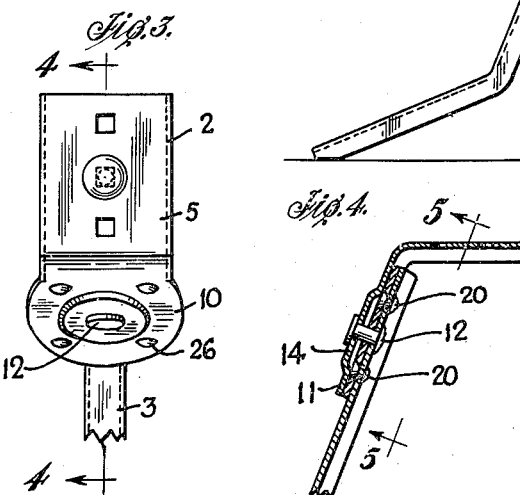
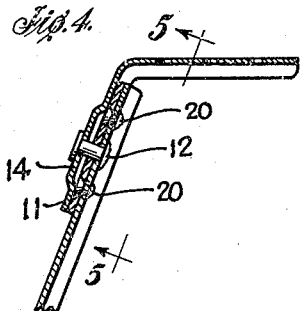
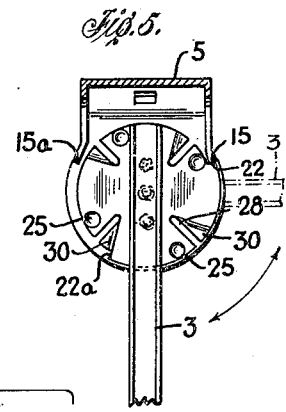
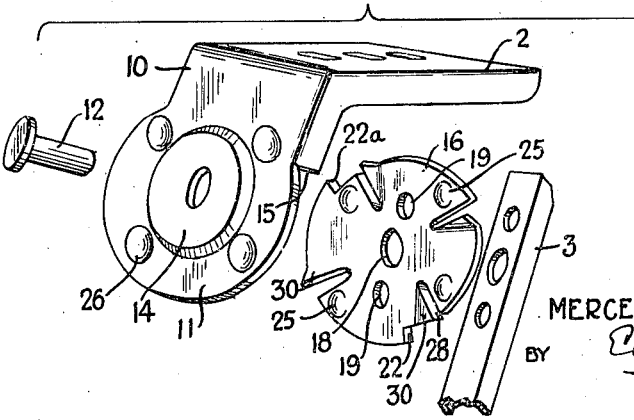
INVENTOR
MERCER D. WALKLET
BY Ely & Frye
ATTORNEYS

Patented Nov. 1, 1949

2,486,583

UNITED STATES PATENT OFFICE 2,486,583

BICYCLE KICK STAND

Mercer D. Walklet, Akron, Ohio, assignor to The Hamlin Metal Products Company, Akron, Ohio, a corporation of Ohio Application February 15, 1945, Serial No. 578,004

7 Claims. (Cl. 280—301)

The present invention relates to attachments primarily intended for bicycles which are known in the trade as "kick stands." Devices of this nature usually employ a pivoted leg or prop which may be turned in one position to support the bicycle while not in use, and moved to another position to be out of the way when the bicycle is being used. Frequently these devices are attached to the lower rear fork of the bicycle near the pedals and are swung backwardly and upwardly in alignment with the rear fork when in inactive position.

Various forms of such devices are known in which some spring detent is employed to hold the support or prop both in raised and lowered positions and it is the purpose of the present invention to improve upon devices of this general character. As such props are usually kicked into and out of place, they are known as "kick stands." Previous "kick stands" have, however, had certain disadvantages which it is the purpose of the present invention to remedy.

Devices of this nature receive rough treatment and it is an object of the invention to provide a sturdy mounting for the pivoted prop which will withstand abuse. It is also an object of the invention to provide a device of this nature which will be positively retained in either position and will not rattle while the bicycle is in use. It is a further object of the invention to simplify and improve upon the spring means which is designed to cause the prop to snap into either position and remain there.

Other objects of the invention are the provision of a device which can be made economically and yet will operate efficiently during the entire life of the bicycle, and to otherwise improve upon prior devices of this type.

In the drawings and description the best known and preferred form of the invention is disclosed, but it will be appreciated that the invention may be modified or improved within the scope thereof as set forth in the appended claims.

In the drawings:

Fig. 1 is a perspective view of a bicycle equipped with a stand made in accordance with the invention, the prop being in lowered position;

Fig. 2 is a side elevation showing the complete attachment, the location of the view being indicated by the line 2—2 of Fig. 1;

Fig. 3 is a view looking at the top of the device;

Fig. 4 is a section on the line 4—4 of Fig. 3;

Fig. 5 is a section on the line 5—5 of Fig. 4; and

Fig. 6 is a perspective view of the device separated into its several parts.

In Fig. 1 a standard bicycle is shown to the lower rear fork 1 of which the improved "kick stand" is attached. 2 indicates the main or supporting bracket on which the leg or prop 3 is pivoted, the latter being preferably bent outwardly at its lower or free end where it contacts the ground when in lowered position. In raised position the prop is substantially parallel to the fork to which it is attached.

The bracket has a horizontal arm 5 by which the attachment is secured to the fork by the clamping plate 6 and the bolt 7. From one side of the arm 5 the bracket is bent downwardly and outwardly at the angle which the prop will assume when in lowered position. This angular arm is indicated as a whole by the numeral 10. Through the arm 5 and extending for a short distance into the angular extension the bracket is channel shaped for rigidity. At its lower end, however, it is formed with a circular flat portion or plate 11 in the center of which the prop 3 is pivoted. The pivot consists of a headed pin 12 the inner end of which is riveted to the prop 3 near its upper end. The shank of the pin passes through and is rotatable in the center of the flat area of the bracket. Preferably the central area of the plate 11 is embossed as shown at 14 to reduce the friction with a spring disk to be described.

It will be noted that at the plate 11 the flanges abruptly terminate to form two shoulders or stops and 15 and 15ᵃ.

Attached to the side of the prop facing the bracket is a disk 16, shown in detail in Figs. 5 and 6, which is made of a relatively heavy spring steel. This disk constitutes the spring detent which causes the prop to snap into position at either end of its movement. It overlies the flat portion 11 of the bracket and is substantially of the same size. It is provided with a central hole 18 to receive the pivot pin 12 and two holes 19 to receive rivets 20 by which the prop and the disk are securely connected. Between spaced points in the edge of the disk the metal is cut out on a shorter radius to provide the two shoulders 22 and 22ᵃ which contact with the stops 15 and 15ᵃ respectively. The shoulders 22 and 22ᵃ are so spaced that when the prop is lowered the shoulders 22 and 15 are in contact and when raised to the dotted line position of Fig. 5 the shoulders 22ᵃ and 15ᵃ are in contact. Preferably the range of pivotal movement of the prop is 90°.

At spaced points about the disk 16 the metal is pressed inwardly to provide knobs or buttons 25 which project above the under or rear side of the disk, and arranged so as to mate with these knobs, corresponding depressions 26 are stamped in the plate 11. The location of the knobs and depressions may be reversed. Four of these mating formations are preferably stamped in the bracket or supporting plate and the disk at 90° apart so that all four of the formations will mate when the prop is in either position. Also only two knobs may be provided with four depressions, if desired.

The spring action of the disk 16 is accomplished through a plurality of radial cuts 28, one margin of each being bent in sector form out of the plane of the disk on the side bearing on the underside of plate 11. The bent portions will occur on that side of the slots which leads in turning of the disk to out-of-use position of the prop 3. This construction, while providing the spring bias at all times to maintain a snug bearing between the parts, is further useful in that it tends to resist motion of the prop out of its stowed position wherein the prop is not subject to any steady pressure during service, but only to sudden shocks of more or less violence; in this case resistance is necessary for only a brief interval and the bent tabs serve this purpose admirably. When it is desired to lower the prop, the pressure of the user's foot will not only afford a steady pressure but will be applied in a mechanically favorable downward direction, and will easily overcome the resistance of the sharp edges of the tabs. On the other hand, when it is desired to raise the prop, it will be engaged through a sidewise motion of the foot, which is mechanically disadvantageous. In such case the biting edges of the tabs are riding away from the opposing surface and the rotation is easily effected with the small force available. In the propped position, of course, the locking action of the tabs is not required since conditions are static, and the load is longitudinally of the prop.

It will be seen that a very simple and yet highly efficient kick stand has been designed. It would be practically impossible to get the device out of order. It may be made very inexpensively as the various parts may be made by simple stamping operations. One of the advantages of the device is that it dispenses with the use of coil springs which increases the life of the attachment over previous kick stands of this general type. The prop snaps into place in either position and will stay there and there are no loose parts to rattle or get out of order. A light coating of grease may be applied between the spring disk and the bracket plate to facilitate the operation. The flat disk spring will not break or deteriorate with age.

These and other advantages will be evident from the description and drawings, it being intended that the specific details of the device as illustrated herein need not be followed in all embodiments of the invention. The invention may be employed on other vehicles than bicycles.

What is claimed is:

1. A kick stand for vehicles comprising a bracket adapted for attachment to the frame of a vehicle, a dependent part on said bracket having a portion with a flat bearing surface, a vehicle prop having a portion with a second flat bearing surface disposed in adjacent parallel relation to the first said surface and pivoted thereon for rotation relatively thereto, tabs carried by one of said portions angularly disposed in relation to the surface thereof, and contacting the other of said surfaces whereby to directly oppose rotation of the said second flat bearing surface to vehicle-supporting position of the prop, but to yield to rotation thereof in the contrary sense.

2. The device of claim 1, wherein said tabs are defined by radially disposed slots in one of the said portions, with one edge of each slot bent out of the plane of the surface of the said one of said portions.

3. In a device as in claim 2, indexing means for the prop comprising complementary extensions and depressions on the bearing surfaces, respectively, adapted to interengage, and responsive to relative turning of the surfaces to disengage.

4. In a device as in claim 1, indexing means for the prop comprising complementary extensions and depressions on the bearing surfaces, respectively, adapted to interengage, and responsive to relative turning of the surfaces to disengage.

5. A device as in claim 1, indexing means for the prop defining its service position and stowed position, respectively, comprising interengaging means on the bearing surfaces, respectively, and responsive to relative turning of the said surfaces to disengage, positive stop means on the rotatable bearing surface for the two said positions of the prop, and means on the bracket engaging the stop means in the two said positions and locking the rotatable bearing surface and prop against motion angularly to the axis of turning when the prop is in service position.

6. A kick stand for vehicles comprising a channeled bracket adapted for attachment to the frame of a vehicle and having a horizontal portion and a dependent portion, a disk integral with the dependent portion and having frusto-spherical portions extending from its surface, a second disk faced on the first disk and having frusto-spherical extensions complementary to those in the first disk to mate therewith, radial slots in the second disk, one margin of each being bent out of the plane of its disk, a prop carried by the second disk, a central pin integrating the prop and the two disks, stop means on the second disk defining the service position and the stowed position of the prop, respectively, by engagement with the sides of the channel bracket, one side of the channel bracket inhibiting motion of the prop angularly to the axis of the said pin by engagement with the said stop, said complementary extensions being in interengagement concurrently with the engagement of the stop means with the bracket.

7. In a device as in claim 6, a central raised portion on the outer of said disks to reduce the effective bearing surface.

MERCER D. WALKLET.

REFERENCES CITED

The following references are of record in the file of this patent:

UNITED STATES PATENTS

| Number | Name | Date |
| --- | --- | --- |
| 531,674 | Brooks | Jan. 1, 1895 |
| 568,667 | Darrach | Sept. 29, 1896 |
| 1,416,626 | English | May 16, 1922 |
| 1,984,299 | Cohen | Dec. 11, 1934 |
| 2,074,422 | Pawsat | Mar. 23, 1937 |

FOREIGN PATENTS

| Number | Country | Date |
| --- | --- | --- |
| 349,375 | Great Britain | May 28, 1931 |